(12) United States Patent
Kaerner et al.

(10) Patent No.: US 9,725,058 B2
(45) Date of Patent: Aug. 8, 2017

(54) METHOD AND CONTROL UNIT FOR TRIGGERING PASSENGER PROTECTION MEANS FOR A VEHICLE

(75) Inventors: Christof Kaerner, Albershausen (DE); Josef Kolatschek, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 1766 days.

(21) Appl. No.: 12/866,171

(22) PCT Filed: Jan. 22, 2009

(86) PCT No.: PCT/EP2009/050718
§ 371 (c)(1),
(2), (4) Date: Aug. 4, 2010

(87) PCT Pub. No.: WO2009/100973
PCT Pub. Date: Aug. 20, 2009

(65) Prior Publication Data
US 2010/0324787 A1    Dec. 23, 2010

(30) Foreign Application Priority Data

Feb. 13, 2008  (DE) .................. 10 2008 008 850

(51) Int. Cl.
*B60R 21/0132*  (2006.01)
*B60R 21/00*  (2006.01)
(52) U.S. Cl.
CPC ...... *B60R 21/0132* (2013.01); *B60R 21/0133* (2014.12); *B60R 21/01332* (2014.12); *B60R 21/01336* (2014.12); *B60R 2021/0006* (2013.01)

(58) Field of Classification Search
CPC ........ B60R 2021/0132; B60R 21/0136; B60R 21/013
USPC .............................. 701/45; 340/436; 280/735
See application file for complete search history.

(56) References Cited

U.S. PATENT DOCUMENTS

| | | | | |
|---|---|---|---|---|
| 6,036,224 A * | 3/2000 | Wachter | .............. | B60R 21/0132 180/282 |
| 6,520,536 B2 * | 2/2003 | Foo | ....................... | B60R 21/013 280/734 |
| 6,725,141 B2 * | 4/2004 | Roelleke | ............. | B60R 21/0132 701/45 |
| 6,856,875 B2 * | 2/2005 | Kocher | ............... | B60R 21/0132 180/271 |
| 7,292,921 B2 * | 11/2007 | Schuller | ................ | B60R 21/013 180/271 |

(Continued)

FOREIGN PATENT DOCUMENTS

DE         198 48 997          4/1999
DE       19938891 A1          2/2001
(Continued)

*Primary Examiner* — Thomas G Black
*Assistant Examiner* — Wae Louie
(74) *Attorney, Agent, or Firm* — Norton Rose Fulbright US LLP; Gerard Messina

(57) ABSTRACT

A method and a control unit for triggering a passenger protection arrangement for a vehicle are described. A crash type is determined as a function of a first signal of a centrally disposed first acceleration sensor system and of a second signal of a second acceleration sensor system disposed in the side region of the vehicle. The triggering of the passenger protection arrangement takes place as a function of the crash type.

10 Claims, 2 Drawing Sheets

(56) References Cited

U.S. PATENT DOCUMENTS

| | | | | |
|---|---|---|---|---|
| 7,349,783 | B2* | 3/2008 | Cashler | B60R 21/0132 280/735 |
| 7,625,006 | B2* | 12/2009 | Foo | B60R 21/0132 280/735 |
| 7,744,123 | B2* | 6/2010 | Foo | B60R 21/0132 180/274 |
| 8,138,900 | B2* | 3/2012 | Mindner | B60R 21/013 180/271 |
| 2002/0145273 | A1* | 10/2002 | Foo | B60R 21/0136 280/735 |
| 2003/0105569 | A1* | 6/2003 | Roelleke | B60R 21/0132 701/45 |
| 2006/0255575 | A1* | 11/2006 | Foo | B60R 21/0132 280/735 |
| 2009/0219149 | A1* | 9/2009 | Mindner | B60R 21/013 340/436 |
| 2010/0324787 | A1* | 12/2010 | Kaerner | B60R 21/0132 701/45 |
| 2011/0218710 | A1* | 9/2011 | Trinh | B60R 21/0136 701/46 |

FOREIGN PATENT DOCUMENTS

| | | |
|---|---|---|
| DE | 10141886 A1 | 3/2003 |
| DE | 102 27 003 | 1/2004 |
| DE | 102 52 227 | 5/2004 |
| DE | 10 2004 016265 | 10/2005 |
| DE | 69922472 T2 | 12/2005 |
| DE | 10 2005 035 415 | 2/2007 |
| DE | 102007048884 A1 | 4/2009 |
| EP | 1 747 945 | 1/2007 |
| WO | 2008/031747 | 3/2008 |

* cited by examiner

METHOD AND CONTROL UNIT FOR TRIGGERING PASSENGER PROTECTION MEANS FOR A VEHICLE

FIELD OF THE INVENTION

The present invention relates to a method and a control unit for triggering a passenger protection arrangement.

BACKGROUND INFORMATION

Triggering a passenger protection arrangement as a function of a differentiation of a so-called AZT (Alliance Center for Technology) and an ODE crash is discussed, for example, in German patent document DE 10 2005 035 415 A1. These crash types are defined in the document indicated. The differentiation is performed by evaluating acceleration signals and environment signals. Both central signals and signals from acceleration sensors disposed in the vehicle side may be used as acceleration signals.

SUMMARY OF THE INVENTION

In contrast, the method according to the present invention and the control unit for triggering a passenger protection arrangement according to the present invention having the features of the independent claims have the advantage that a simpler, yet reliable, differentiation of crash types, in particular of the AZT and the ODB crashes, is possible. This is achieved in that the crash type recognition is determined as a function of a signal of a centrally disposed acceleration sensor system and an acceleration sensor system in the vehicle side, sensing in the vehicle transverse direction. In particular, the exemplary embodiments and/or exemplary methods of the present invention is thus suitable for differentiating different frontal crash types. This allows for so-called upfront sensors to be omitted. The latter are sensors that are installed in the vehicle front end.

The following considerations provide the basis of the present invention:

Although typical accident situations using offset barriers and angle barriers clearly differ with regard to crash severity, crash velocity, and barrier properties, the signals that are registered in a sensor are very similar in amplitude and characteristic in the first 30 ms, for example. The crash start is detected when a noise threshold is exceeded, for example. The reason for this, i.e., for the similarity of these signals, is the very indirect transmission path between the location of impact and the sensor position, which runs along longitudinal members, partition walls, and the floor panel of the vehicle. All of these components, which differ greatly in terms of their structure, affect the signal, modify it, and additionally impart a portion of their local properties to the signal. For example, the local oscillation properties of specific components are imparted to the signal. Because in the collision types mentioned (AZT, ODB) the main force application also occurs at a location a certain distance from the central axle of the vehicle, on which the driving sensor sits, furthermore only a part of the force path in the direction of the sensor installation location.

All of these conditions result in the following: the original signals, which at the location of the impact are definitely recognizably different, approximate each other more and more in terms of their properties along this transmission path in the direction of the central sensor. At the end, the signals are so similar that they can be distinguished only with great difficulty. According to the exemplary embodiments and/or exemplary methods of the present invention, the solution to the problem of differentiation is to use an additional transmission path that does not modify the signals of these collision types to such a large degree. Upon considering the typical design of a vehicle body, it may be seen that the side structure, with its sill structure extending in the longitudinal structure, constitutes a very direct connection to the longitudinal members and the crash box structure in the vehicle front end. All of these elements progress in the vehicle longitudinal direction and roughly in a line.

A very strong signal diversion, as in the case of the central sensor (longitudinal member-vehicle-partition-tunnel), does not take place. Since a side-impact acceleration sensor, which is located in the sill or below at the foot of the B column, is also very directly connected to this structure, the use of these sensor signals provides the basis of the method and control unit according to the present invention. The disadvantage that this sensing direction of this side-impact sensor in general consists in only the vehicle transverse direction does not change anything about the exploitability of the signals. If the signals in the vehicle longitudinal or vertical direction are available, they may also be used according to the method according to the present invention.

It should be noted that in the event of an AZT crash, a triggering of the passenger protection arrangement does not occur, whereas in the event of the ODB crash, such a triggering must occur.

In the case at hand, a control unit is an electric device that processes sensor signals and generates control signals as a function of them, for example, for triggering the passenger protection arrangement. The triggering of the passenger protection arrangement refers to their activation. Passenger protection arrangement include airbags, belt tighteners, and crash-active headrests, for example. However, other known passenger protection arrangements may also be understood by this.

The interfaces may be hardware or software interfaces. In particular, in a hardware implementation, these interfaces may be designed as part of a system module. However, all other hardware-based approaches may also be represented in the case at hand. In a software design, the interface may exist in particular on a processor, such as a microcontroller, as a software interface.

The centrally disposed first acceleration sensor system is disposed centrally in the vehicle, and is disposed, for example, in the control unit itself, or in a separate control unit for sensors or simply in a sensor box. The centrally disposed acceleration sensor system may also be installed in other ways. The second acceleration sensor system is disposed in the side region of the vehicle. This means that it may be disposed, for example, as specified above, at the foot of the B column or also at other locations on the B column, or in the seat support or on the door sill or in the region of the A or C columns. The acceleration sensor may also be disposed in a side part of a vehicle, in the door. Normally, the second acceleration sensor system senses essentially in the vehicle transverse direction, and the first acceleration sensor system in the vehicle longitudinal direction. The acceleration sensor system normally involves sensor elements produced micromechanically, which may be done using surface micromechanics, which already have sensor pre-processing and corresponding communication modules in order to transmit the sensor signals to the control unit.

The evaluation circuit is normally a processor, a microcontroller, for example. But other processor types, in particular, multicore processors, are also possible in the case at hand. In addition, another possibility is evaluation circuits that do not use any software, but perform the above using specially developed hardware, for example as an integrated circuit. At least partially discrete design approaches are also possible.

The determination module and the triggering module are implemented accordingly.

The triggering circuit may also be a part of the system ASIC already mentioned. However, it may also be implemented separately.

The first and second signal may be any type of signal; in particular, they may also be a multiplex of a plurality of signals.

The crash type is determined as a function of the first and of the second signal, it being possible for the determination to be made using all possible methods of evaluating the first and second signal. In particular, signals derived from the first and the second signal may be used, and this derivation may consist in integration, differentiation, or other mathematical modifications, for example. This also includes filtering.

The determination of the crash type is essential for the triggering of the passenger protection arrangement. Thus, the triggering module is capable of performing the triggering as a function of this determined crash type.

Advantageous improvements of the method and control unit for triggering the passenger protection arrangement for a vehicle recited in the independent claims are rendered possible by the measures and further refinements recited in the dependent claims.

In this context, it is advantageous that the second signal is an alternating component of a measuring signal of the second acceleration sensor system. It has been shown that the alternating component of such an acceleration sensor system, which is normally intended for side-impact recognition, contains important information about the crash. In particular, it contains the dynamics of the crash particularly well. The alternating component may be ascertained by eliminating the direct component, using a high-pass, for example.

It is furthermore advantageous that an amplitude of the alternating component or an amount of this amplitude is used, a distinction then being made between an ODB crash type and an AZT crash type as a function of a threshold value comparison with this amplitude or the corresponding amount. This allows for a very simple differentiation of these crash types. Instead of the amount, a power of the amplitude may also be used. In particular, the threshold may be used dynamically or adaptively as a function of the signal of the central sensor system. Thus, when the central signal indicates a corresponding situation, the threshold may be set to a more sensitive setting. As an example, if the amplitude of the side-impact sensor system, which senses in the lateral direction, exceeds a particular threshold, the collision is more likely to be of the ODB crash type, and when the threshold is undershot, there is a great likelihood of an AZT crash. It is possible for the time feature to be used for the evaluation, in that the second signal is evaluated only up to a specific time. Advantageously, an amount or a power of the amplitude may be used for the threshold value comparison.

The threshold may advantageously be implemented in an adaptive manner; for example, it could be modified as a function of the time or the signal of the first acceleration sensor system.

It is furthermore advantageous that the ascertained crash type enters into a triggering algorithm as an input variable, additional crash variables also entering into the triggering algorithm, in order to determine the triggering. This means that the method according to the present invention is a function that the triggering algorithm uses in order to modify its triggering threshold, for example. That is, the crash type, for example, AZT or ODB, modifies the threshold in this triggering algorithm in a predefined way. This may occur in an additive manner, as a so-called "add-on," or also in a multiplicative manner.

It is furthermore advantageous that the second signal is a low-frequency component of the measuring signal of the second acceleration sensor system. This may take place through a filtering, for example, a low-pass filtering, for example, or also an integration of the measuring signal. The conditions of the vehicle body determine whether the alternating component or the low-frequency component is used.

Exemplary embodiments of the present invention are illustrated in the drawing and explained in greater detail in the following description.

DETAILED DESCRIPTION

Figure 1:
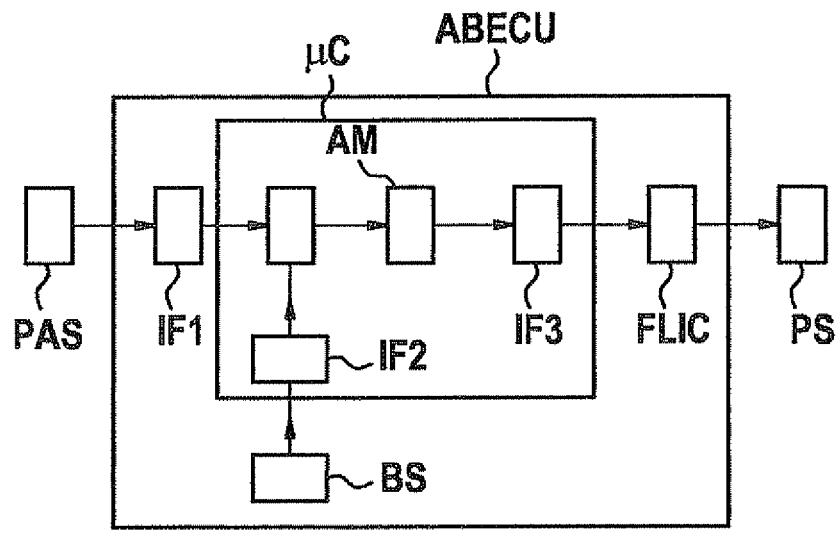
FIG. 1 shows a block diagram of the control unit according to the present invention having connected components.

FIG. 1 illustrates in a block diagram control unit ABECU according to the exemplary embodiments and/or exemplary methods of the present invention as a so-called airbag control unit that triggers the passenger protection arrangement PS. For example, only side-impact sensor system PAS is connected to airbag control unit ABECU, that is, an acceleration sensor system that is located in the side parts of the vehicle. This acceleration sensor system is connected to airbag control unit ABECU via a point-to-point connection or a bus connection. In particular a current interface may be used, in which acceleration sensor system PAS modulates its measuring data in a predefined protocol on a current, for example, in a Manchester protocol. Acceleration sensor system PAS is also already supplied with energy via a direct current through this transmission line. Acceleration sensor system PAS is connected to interface IF1 in airbag control unit ABECU. Interface IF1 is part of a so-called system ASIC, for example, that is, an integrated circuit, which houses the most different functions for the control unit. In the case at hand, only the functions and components that are imperative for the understanding of the exemplary embodiments and/or exemplary methods of the present invention are illustrated. Additional components necessary for operation are omitted for the sake of simplicity.

Interface IF1 formats the data received from acceleration sensor system PAS into a format for microcontroller µC, for example, using the so-called SPI (serial peripheral interface), in order to transmit these data via this SPI bus to a microcontroller µC. In control unit ABECU, an acceleration sensor system BS is also provided as a central acceleration sensor system, which in particular senses essentially in the vehicle longitudinal direction. This acceleration sensor system provides its data to microcontroller µC in a digital manner, for example. An analog connection is also possible.

An interface IF2 also exists as a software module in microcontroller µC, in order to receive the signals of acceleration sensor system BS and to relay them to the additional software modules.

As an additional software module, an evaluation module BM obtains the signals from interfaces IF1 and IF2 in order to determine the crash type in the method according to the present invention. This is explained below with the aid of FIGS. 2 and 3. In particular, it makes a distinction between the ODB crash and the AZT crash in the event of a frontal crash.

The crash type determined in this manner is transmitted in triggering module AM, which generates a triggering signal, which is transmitted via interface IF3 in microcontroller μC to triggering circuit FLIC, for example, via the SPI bus as well. Triggering circuit FLIC, having an evaluation logic for the triggering signal and the corresponding electrically controllable power switches for supplying power to ignition elements for airbags or belt tighteners, for example, then provides the activation or triggering of the passenger protection arrangement PS in the manner predetermined in the control signal.

Additional software modules may exist in microcontroller μC, in particular, an additional triggering algorithm, into which the crash type determined by module BM enters as an input parameter. This triggering algorithm then modifies, for example, its threshold or thresholds as a function of this determined crash type. Additional variations known to one skilled in the art are possible.

Airbag control unit ABECU is a structurally closed unit, which features a metal and/or plastic housing, for example, in which the individual components described above are located. It is possible for airbag control unit ABECU to be implemented without a sensor system altogether, and acceleration sensor system BS is then installed on a sensor control unit or by itself centrally in the vehicle, for example. Airbag control unit ABECU may then be disposed at a suitable location in the vehicle. In addition to the sensors described here, additional accident sensors may also be used, in order to provide in particular the triggering algorithm with corresponding input variables.

Figure 2:
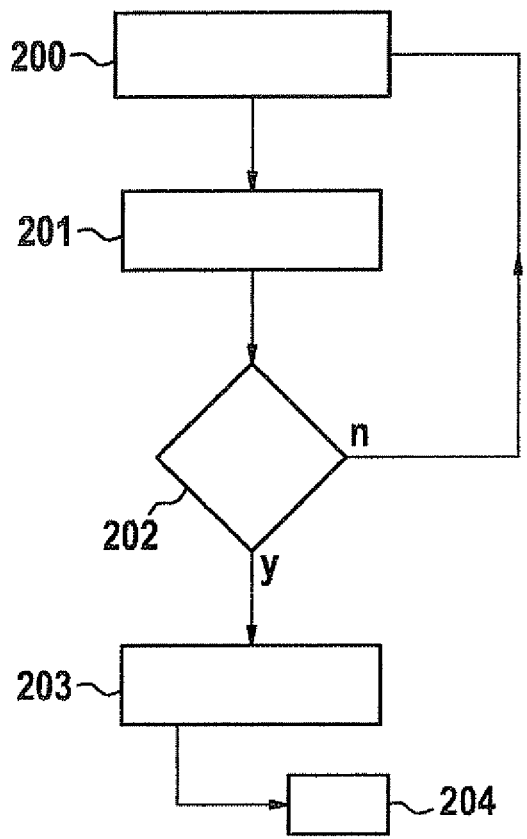
FIG. 2 shows a first flow chart of the method according to the present invention.

FIG. 2 shows the method according to the present invention in a flow chart. In method step 200, the first signal is provided by central sensor system BS and the second signal by the second acceleration sensor system PAS. Then, in method step 201, with the aid of the central signal, for example, also with the aid of the time elapsed since the crash start, a decision is made regarding whether a variable that calls for the further processing of the second signal, i.e., of the second acceleration sensor system, is outputted. This is checked in method step 202. If it was determined with the aid of the central signal that a further processing is no longer indicated, then a return to method step 200 takes place. However, if it was determined in method step 202 that a further processing of the second signal is indicated, then it is switched to method step 203. In method step 203, the crash type that exists, an ODE or an AZT crash, is then determined with the aid of a threshold value query of the second signal, that is, of the second acceleration sensor system. The threshold may be modified as a function of the first signal and/or the time. The crash type ascertained in this manner is then used in method step 204 to generate a corresponding triggering signal.

Figure 3:
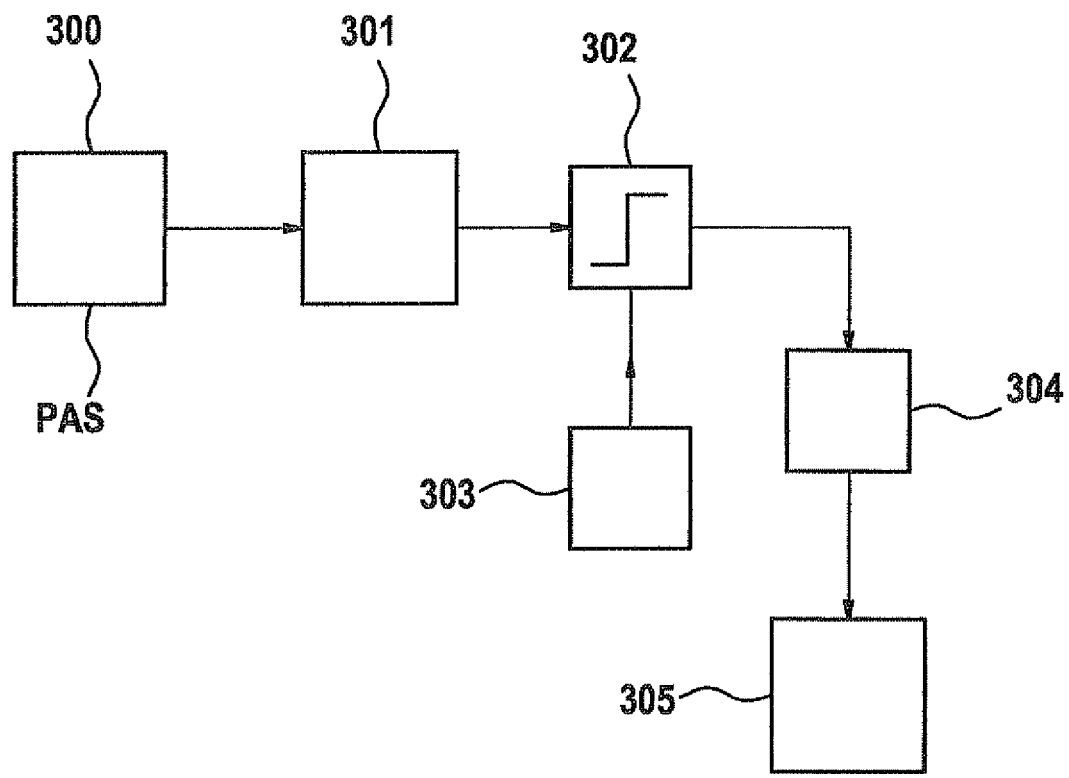
FIG. 3 shows a second flow chart of the method according to the present invention.

FIG. 3 shows an additional flow chart of the method according to the present invention. In method step 300, the second signal of the acceleration sensor system in the side region of the vehicle is provided. This is subjected to a preprocessing in method step 301, which may take place on the sensor side already, for example. This preprocessing may comprise either the determination of the alternating component of the measuring signal or of the low-frequency component. The second signal created in this manner is then subjected to a threshold value comparison in method step 302, it being possible to modify the threshold as a function of method step 303 and thus as a function of the central signal. The crash type may then be determined in method step 304 with the aid of the result of the threshold value comparison from method step 302. Then, in method step 305, this crash type is provided to an additional triggering algorithm as an add-on or as a multiplier for its threshold. This algorithm then determines whether and which passenger protection arrangement must be triggered, and how.

What is claimed is:

1. A method for triggering a passenger protection arrangement for a vehicle, the method comprising:
   determining a crash type as a function of a first signal of a centrally disposed first acceleration sensor system and of a second signal of a second acceleration sensor system disposed in a side region of the vehicle; and
   triggering the passenger protection arrangement as a function of the crash type;
   wherein the second signal is an alternating component of a measuring signal of the second acceleration sensor system; and
   wherein the second signal is obtained by removing a direct component of the measuring signal.

2. The method of claim 1, wherein an amplitude of the alternating component is used as the second signal, and wherein a differentiation of an ODB crash type and an AZT crash type is performed as a function of a threshold value comparison with this amplitude.

3. The method of claim 2, wherein an amount or a power of the amplitude is subjected to the threshold value comparison.

4. The method of claim 2, wherein a threshold for the threshold value comparison is modified as a function of the first signal or a time from the crash start.

5. The method of claim 1, wherein the determined crash type enters into a triggering algorithm as an input variable, and wherein additional crash variables also enter into the triggering algorithm, so as to determine the triggering.

6. The method of claim 1, wherein the second signal is an amplitude of the alternating component of the measuring signal of the second acceleration sensor system.

7. A method for triggering a passenger protection arrangement for a vehicle, the method comprising:
   determining a crash type as a function of a first signal of a centrally disposed first acceleration sensor system and of a second signal of a second acceleration sensor system disposed in a side region of the vehicle; and
   triggering the passenger protection arrangement as a function of the crash type;
   wherein a low-frequency component that is obtained by removing a direct component of the measuring signal of the second acceleration sensor system is used as the second signal.

8. The method of claim 7, wherein the low-frequency component is generated by filtering the measuring signal.

9. The method of claim 7, wherein the low-frequency component is generated by integrating the measuring signal.

10. A control unit for triggering a passenger protection arrangement for a vehicle, comprising:
   a first interface arrangement for providing a first signal of a centrally disposed first acceleration sensor system;
   a second interface arrangement for providing a second signal of a second acceleration sensor system disposed in a side region of the vehicle;

an evaluation circuit for a determination module for determining a crash type as a function of the first signal and the second signal, and a triggering module for generating a triggering signal as a function of the crash type; and
a triggering circuit for triggering the passenger protection arrangement as a function of the triggering signal;
wherein the second signal is an alternating component that is obtained by removing a direct component of a measuring signal of the second acceleration sensor system.

* * * * *